United States Patent [19]

Popp

[11] Patent Number: 4,642,027
[45] Date of Patent: Feb. 10, 1987

[54] METHOD AND STRUCTURE FOR PREVENTING THE IGNITION OF TITANIUM FIRES

[75] Inventor: Joachim Popp, Dachau, Fed. Rep. of Germany

[73] Assignee: MTU Motoren-und Turbinen-Union Muenchen GmbH, Munich, Fed. Rep. of Germany

[21] Appl. No.: 704,524

[22] Filed: Feb. 22, 1985

[30] Foreign Application Priority Data

Mar. 3, 1984 [DE] Fed. Rep. of Germany ....... 3407945

[51] Int. Cl.$^4$ .............................................. F01D 5/08
[52] U.S. Cl. ................... 415/177; 415/178; 415/200; 415/212 A; 165/133; 165/47; 29/156.8 R; 29/527.1
[58] Field of Search ............... 415/177, 178, 219 R, 415/174, 200, 108, 168, 212 A, 199.5, 9, 196, 175, 176, 144, 214; 29/156.8 R, 157 R, DIG. 25, 527.1, 458; 165/47, 49, 133

[56] References Cited

U.S. PATENT DOCUMENTS

| | | | |
|---|---|---|---|
| 2,710,523 | 6/1955 | Purvis | 415/214 |
| 2,922,721 | 1/1960 | Tarkan et al. | 415/214 |
| 3,097,824 | 7/1963 | Bunger et al. | 415/9 |
| 3,221,500 | 12/1965 | Hill | 415/214 |
| 3,800,864 | 4/1974 | Hauser et al. | 415/178 |
| 4,122,673 | 10/1978 | Leins | 415/200 |
| 4,155,680 | 5/1979 | Linko, III et al. | 415/144 |
| 4,155,681 | 5/1979 | Linko, III et al. | 415/168 |
| 4,199,300 | 4/1980 | Tubbs | 415/174 |
| 4,212,348 | 7/1980 | Kobayashi | 165/49 |
| 4,371,312 | 2/1983 | Tank | 415/200 |
| 4,432,413 | 2/1984 | Brass et al. | 165/133 |
| 4,492,522 | 1/1985 | Rossmann et al. | 415/200 |

FOREIGN PATENT DOCUMENTS 2103718  2/1983  United Kingdom ................ 415/178

Primary Examiner—Robert E. Garrett
Assistant Examiner—John Kwon
Attorney, Agent, or Firm—W. G. Fasse; D. H. Kane, Jr.

[57] ABSTRACT

In machine assemblies made of titanium or titanium alloys, such as turbo-compressors, where at least one rotating member is arranged directly adjacent to at least one stationary structural titanium member, the radially outer contours or surfaces of a radially inner stationary member, as viewed relative to the respective axis of rotation, are provided with a surface layer of a highly heat-conductive material. This heat-conducting layer enables the heat of friction generated when a fragment is jammed inbetween a moving and a stationary member, to be dissipated extremely rapidly over a large surface area to keep the titanium casing material from reaching the ignition temperature, whereby the ignition of titanium fires is prevented.

13 Claims, 1 Drawing Figure

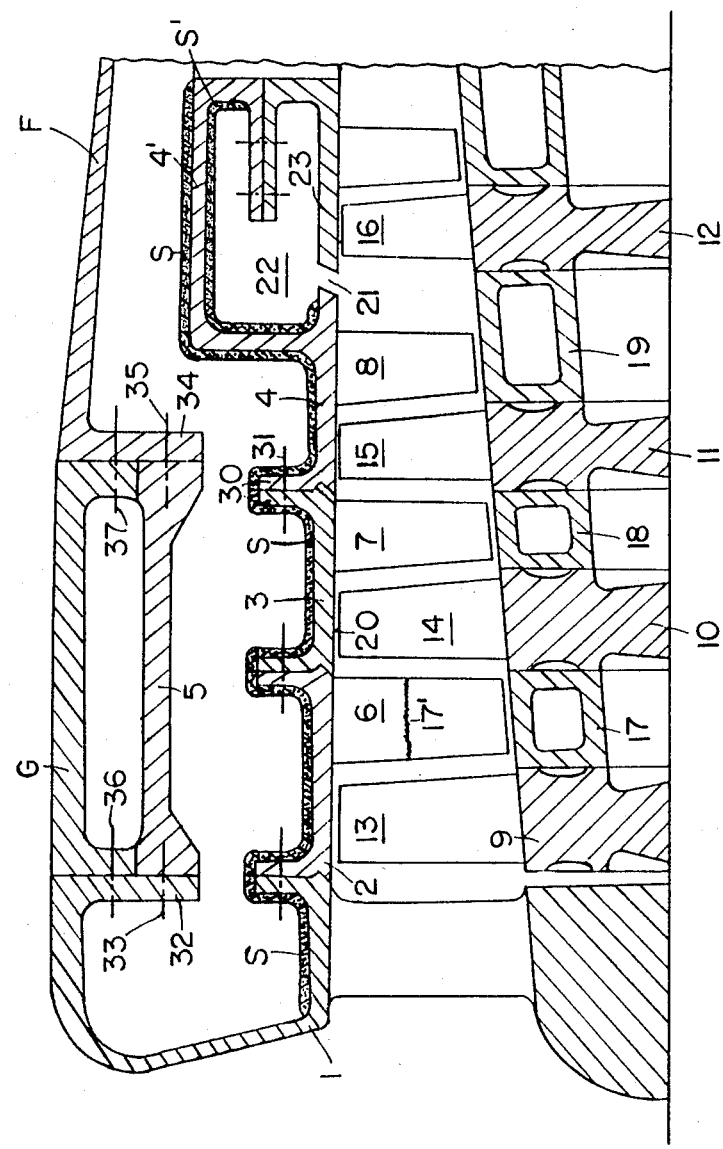

METHOD AND STRUCTURE FOR PREVENTING THE IGNITION OF TITANIUM FIRES

FIELD OF THE INVENTION

This invention relates to a method and structures for preventing the ignition of titanium fires on machine assemblies made of essentially titanium or titanium alloys, wherein at least one rotating member is arranged directly adjacent to at least one stationary structural member made of titanium.

DESCRIPTION OF THE PRIOR ART

In gas turbine engines, especially gas turbine engines for aircraft, use is made, among others, of titanium alloys for casings, rotors and blades. In the event of engine damage, a foreign object or a fragment of an engine component may be jammed between the titanium rotor blade and the titanium casing and be carried along circumferentially by the rotor blades, causing friction resulting in overheating of the blades and casing. The same may happen when, for example, titanium rotor blades or other rotating titanium components contact stationary titanium parts when the required axial or radial clearance no longer exists. In such a situation the ambient conditions may be such that the titanium may start burning in an explosive manner at the point of friction. Cases have been known where flying and burning titanium particles have pierced several walls, even of steel, until the so-called titanium fire died of its own once said ambient conditions ceased to prevail. It is clear that so far it has been due only to favorable circumstances that catastrophies due to titanium fires have not occurred in aviation.

In order to utilize the advantages afforded by titanium, which come as a result of its low specific weight and excellent strength, the following measures have been proposed heretofore.

Rotor and stator blades have been dimensioned for better strength to prevent fracture in the event of an impact of a foreign object. However, this approach has resulted in aerodynamically inferior blade profiles of heavier weight.

Larger axial or radial spacings or gaps between rotating and stationary titanium components have been used to prevent rubbing in service. However, such larger gaps cause corresponding leak air losses.

Coating the stationary components has been suggested for protecting them in the event of incidental rubbing. However, aerodynamic considerations permit partial coating only.

The stationary components have been made of steel. However, an unproportionally large weight is the penalty.

Protective liners of carbon/polyimide resin have been used on components jeopardized by flying and burning titanium particles in case of a titanium fire. However, such liners can be used only at service temperatures not exceeding 260° C., which prevents their application, e.g., directly at the source of ignition in a high-pressure compressor.

OBJECTS OF THE INVENTION

In view of the foregoing it is the aim of the invention to achieve the following objects singly or in combination:

to avoid the above mentioned disadvantages of the prior art;

to prevent the ignition of titanium fires in a simple yet effective manner; and to make sure that a rapid heat removal from a danger spot will prevent so-called titanium fires.

SUMMARY OF THE INVENTION

According to the invention the ignition of titanium fires is prevented in a structure comprising stationary and rotary components, at least one of which is made of titanium or of titanium alloys, by a heat conducting coating on the radially outer surface of a radially inner stationary component.

By arranging and constructing the heat dissipating layer as disclosed herein, the heat of friction is dissipated rapidly enough to keep the temperature of the titanium in the casing from reaching the ignition point. The locally high thermal energy, accordingly, is reduced to a lower level over a large surface area. In this manner the ignition of titanium fires is prevented even before it can start.

BRIEF DESCRIPTION OF THE DRAWING

In order that the invention may be clearly understood, it will now be described in more detail with reference to the single FIGURE of the accompanying drawing showing a sectional view through a portion of a gas turbine jet engine.

DETAILED DESCRIPTION OF PREFERRED EXAMPLE EMBODIMENTS AND OF THE BEST MODE OF THE INVENTION

The single FIGURE illustrates an axial-flow compressor for a gas turbine jet engine. The stationary casing structure forming the outer duct wall of the compressor immediately adjacent to the rotor comprises several radially inner wall sections 1, 2, 3 and 4, which have flanges 30 bolted together at 31. A further intermediate supporting ring 5 is anchored to an outer flange 32 of the stator casing section 1 by bolts 33 and to a flange 34 of a further outer casing section F by bolts 35. A further outer casing section G is connected to the flange 32 by bolts 36 and to the flange 34 by bolts 37. The sections 1, 2, 3 and 4, the supporting ring 5, and the other outer casing components G, F shown in the drawing are made of titanium or a titanium alloy. The stator wall sections, such as 2, 3 and 4, carry guide vanes 6, 7, 8, which may, for example, be made of a metallic material, e.g. a nickel alloy. The rotor comprises disks 9, 10, 11, 12 carrying rotor blades 13, 14, 15, 16, and the intermediate spacer ring elements 17, 18, 19. These rotor components are made of titanium or a titanium alloy. The rotor disks may also be made of some other suitable metallic material, however.

In the basic concept of the invention a surface layer S of a highly heat-conductive material is deposited on the radially outer contours or surfaces of the radially inner stator sections 1, 2, 3, 4, as viewed relative to the axis of rotation.

Thus, when a fracture 17' occurs of, e.g., a guide vane 6 of a first compressor stage, the fragment may possibly jam or lodge itself in the gap between a rotor blade and a stator section, e.g. at a point 20 and may be taken along circumferentially. The heat of friction generated by this fragment is now prevented from igniting the respective casing wall section 3 because the heat of friction is extremely rapidly dissipated by the heat conducting layer S thereby lowering the temperature to a level that will prevent reaching the ignition point of the titanium casing material, for instance of the wall section 3. Thus, the layer S prevents the ignition of titanium fires even before it has a chance to start.

The present invention will be useful even when, as shown in the drawing, the structure of the compressor duct wall is at least partially rather irregular in the region between the last two axial-flow compressor stages, where access is difficult especially in the assembled condition of the compressor and/or when the wall is interrupted by one or several bleed-air slots 21, opening into a ring chamber 22 the outer wall 4' of which extends essentially in parallel to the outer compressor duct wall above the bleed-air slot 21 and above the poorly accessible wall portion 23. In this arrangement it will be advantageous to coat the outer wall 4' externally and internally with a highly heat-conductive layer S and S', where the outer wall 4' preferably forms an integral part of the outer compressor duct wall, or of the wall section 4 as shown in the drawing.

Then when in an arrangement as just described a glowing hot foreign object or titanium particle is flung into the ring chamber 22 through the bleed-air slot 21, the ignition of a titanium fire will be safely prevented, especially as a result of the highly heat-conductive construction of the casing with the inner and outer heat conducting coatings S and S' on the outer wall 4'.

The present invention will also be quite advantageous for other machine assemblies made of titanium or a titanium alloy, where at least one rotating member is arranged directly adjacent to at least one stationary structural titanium member. In accordance with the basic concept of the present invention the radially outer contours of the radially inner section or sections of the respective stationary structural member, as viewed relative to the respective axis of rotation of the machine assembly, could be provided with a surface layer of a highly heat-conductive material.

It is important for an efficient heat dissipation that the highly heat-conductive surface layers S or S' enter into a maximally intimate or well bonded union with the titanium material surface. Such a bond can be achieved, among other possibilities, by depositing the highly heat-conductive layer as a flame or plasma sprayed metal coating or by applying such a layer as brushing or spraying liquid similar to paint, such as a metal varnish or it may be applied as a pasty compound.

Coating materials having suitable service characteristics for the present purpose and which are also suitable for the implementation of the present invention are obtained singly and/or in partial combination of the following features. An aluminum alloy is applied as a highly heat-conductive layer. Such aluminum alloy may, for example comprise 94% aluminum and 6% silver in percent by weight.

A copper alloy is another suitable material for making the heat-conducting layer. Further, a copper, zink, silver alloy is suitable as a coating material, whereby such alloy comprises 38% copper, 32% zink and 30% silver, in percent by weight.

The invention is suitable for use in stationary gas turbine plants and/or in aircraft gas turbine engines, especially on one or several axial and/or radial flow compressors of such turbine engines.

In connection with axial and/or radial compressors for any kind of turbine engine it is advantageous to apply the highly heat-conductive layer in the axial and in the radial directions so that, e.g., on an axial-flow compressor configuration in accordance with the present drawing, both the radial flange areas and any radial fillets, as well as any outer wall areas extending in parallel to the rotational axis so that all sides or surfaces are homogeneously covered with the coating material.

With a view especially to an axial-flow compressor concept as shown on the accompanying drawing the present invention affords another advantage in that the inner structural member or casing wall facing the rotor or the rotor blade tips can be shaped for an ideal aerodynamic configuration, except perhaps for any usual abradable coating, if present. In other words, the present coating does not influence any structural requirements of the turbine engine, since the coating is applied prior to the assembling of the engine components. Even both sides of section 4, 4' can easily be coated prior to assembly. Also, the maximum use of titanium as a component material can be continued without any further aerodynamic or weight penalties. In other words the turbomachine component involved, for example the compressor, can be optimally adapted to the thermodynamic cycle without any risk of a titanium fire.

Although the invention has been described with reference to specific example embodiments, it will be appreciated, that it is intended to cover all modifications and equivalents within the scope of the appended claims.

What I claim is:

1. A structure for preventing the ignition of a titanium fire in a machine assembly, such as a turbine engine, comprising a structural stationary component (1, 2, 3, 4, 5) made of titanium or titanium alloy, and a rotatable component (9 to 19) having a rotational axis and arranged for cooperation with said stationary component, said stationary component (1, 2, 3, 4) comprising radially inner first surfaces facing said rotatable component relative to said rotational axis and having second surfaces (S) located radially outwardly relative to said rotational axis, said second surfaces being accessible for treatment at least prior to assembling said components, said stationary component further comprising a protective coating layer (S) of a highly heat-conducting material intimately bonded directly to said second surfaces (S) for rapidly dissipating heat to prevent reaching temperatures that would otherwise cause said titanium fires.

2. The structure of claim 1, wherein said stationary component comprises guide vanes for forming an axial compressor, said second surfaces facing away from said guide vanes and carrying said protective coating layer of highly heat-conducting material.

3. The structure of claim 2, wherein said stationary component comprises a plurality of stator sections with radially outwardly reaching flange means (30) for interconnecting adjacent stator sections, said protective coating layer of highly heat-conducting material covering said second surfaces, also covering said flange means in radial and axial directions to form a substantially uninterrupted coating in the radial and axial directions all around said stator sections including said flange means.

4. The structure of claim 3, wherein at least one of said stator sections forms a ring chamber having an outer chamber surface and an inner chamber surface, and wherein said protective coating layer of highly heat conducting material covers also at least a portion of said chamber surfaces.

5. The structure of claim 4, wherein said ring chamber has air-bleed holes leading into said ring chamber from a gap between said stator sections and said rotatable component, and wherein said protective coating layer of highly heat-conducting material covers said inner chamber surface at least opposite said air-bleed holes.

6. The structure of claim 1, wherein said rotatable component is also made of titanium or titanium alloy.

7. The structure of claim 1, wherein said second surfaces face radially outwardly relative to said rotational axis.

8. The structure of claim 1, wherein said second surfaces face radially inwardly relative to said rotational axis.

9. The structure of claim 1, wherein said protective coating layer is an aluminum alloy layer.

10. The structure of claim 9, wherein said aluminum alloy comprises 94% of aluminum and 6% of silver, both by weight of the alloy.

11. The structure of claim 1, wherein said protective coating layer is a copper alloy coating.

12. The structure of claim 11, wherein said copper alloy coating is a copper-zinc-silver alloy.

13. The structure of claim 12, wherein said copper alloy includes 38% of copper, 32% of zinc and 30% of silver, all by weight of the alloy.

* * * * *